US007625102B2

(12) United States Patent
Koike et al.

(10) Patent No.: US 7,625,102 B2
(45) Date of Patent: Dec. 1, 2009

(54) LIGHTING DEVICE

(75) Inventors: Teruo Koike, Tokyo (JP); Shoichi Bamba, Tokyo (JP); Ryotaro Owada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/248,142

(22) Filed: Oct. 13, 2005

(65) Prior Publication Data

US 2006/0083002 A1 Apr. 20, 2006

(30) Foreign Application Priority Data

Oct. 14, 2004 (JP) ............................ 2004-300655

(51) Int. Cl.
*G02B 3/02* (2006.01)

(52) U.S. Cl. .................... 362/277; 362/311.1; 362/335; 359/708; 359/728

(58) Field of Classification Search ................. 362/326, 362/277, 327, 328, 335, 336, 347, 538; 359/708, 359/728
See application file for complete search history.

(56) References Cited

U.S. PATENT DOCUMENTS

| | | | | |
|---|---|---|---|---|
| 6,364,514 | B1 * | 4/2002 | Natsume | 362/522 |
| 6,575,582 | B2 * | 6/2003 | Tenmyo | 362/16 |
| 6,951,416 | B2 * | 10/2005 | Sazuka et al. | 362/538 |
| 6,960,776 | B2 | 11/2005 | Machi | |
| 2002/0070360 | A1 | 6/2002 | Machi | |
| 2005/0270792 | A1 * | 12/2005 | Suzuki | 362/517 |

FOREIGN PATENT DOCUMENTS

| | | |
|---|---|---|
| JP | 2004-087179 | 3/2004 |

* cited by examiner

*Primary Examiner*—Sandra L O'Shea
*Assistant Examiner*—Evan Dzierzynski
(74) *Attorney, Agent, or Firm*—Cermak Knealy Vaidya & Nakajima LLP

(57) ABSTRACT

A lighting device can have a simple configuration which can be formed compactly in the direction of its optical axis in particular, and with a light weight. The lighting device can also have a functional, three-dimensional innovative appearance for the sake of enhanced merchantability and novelty. The lighting device can include a light source and a projection lens which is situated so that its source-side focus lies near the light source and its optical axis generally coincides with that of the light source. The projection lens can be a distribution control lens of convex form, having an exit surface shaped aspherically so that the direction of emission is continuously refracted into specified directions with respect to the angle of incidence from the focal position.

24 Claims, 13 Drawing Sheets

LIGHTING DEVICE

This application claims the priority benefit under 35 U.S.C. §119 of Japanese Patent Application No. 2004-300655 filed on Oct. 14, 2004, which is hereby incorporated in its entirety by reference.

BACKGROUND OF THE INVENTION

1. Field of the Invention

The invention relates to a lighting device, and more particularly to automotive/vehicular lighting devices such as headlamps, auxiliary headlamps, and various lamps that are arranged in front parts of a motor vehicle. In addition, the invention relates to illuminating lights for use in lighting fixtures such as traffic lamps, household lamps, general vehicle lamps, etc.

2. Description of the Related Art

FIGS. 1 and 2 show examples of configurations of conventional lighting devices. The lighting device 1 shown in FIG. 1 is composed of a light source 2, a projection lens 3 for focusing the light from the light source 2, and a distribution control member 4 arranged in front of the projection lens 3.

The light source 2 is a near point-like light source, such as an LED. When a drive voltage is applied thereto, the LED emits light to a predetermined range of angles about its optical axis perpendicular to a mounting board 2*a*.

The projection lens 3 is made of a convex lens. This convex lens is configured so that its source-side focus lies near the light source 2, and its optical axis coincides with that of the light source 2.

The distribution control member 4 is a plate-like transparent member, for example, which has lens-cut prisms for light diffusion on one of its surfaces (in the case shown in FIG. 1, the lens-cut prisms are provided on the source-side bottom surface).

In the lighting device 1 thus configured, light emitted from the light source 2 is incident on the projection lens 3. The light is focused by the projection lens 3 into near parallel light, which is incident on the distribution control member 4. The light incident on the distribution control member 4 is then diffused by the distribution control member 4 as appropriate, given a desired light distribution characteristic, and is projected toward the front.

Turning now to FIG. 2, a lighting device 5 is composed of a light source 2, a reflecting surface 6 for reflecting light from the light source 2 toward the front (upward in the diagram), and a projection lens 7 for focusing the light from the reflecting surface 6.

The reflecting surface 6 is made of an elliptic reflecting surface, for example, which is situated so that a first focus thereof lies near the light source 2 and its major axis coincides with the optical axis of the light source 2. The projection lens 7 is made of an aspheric lens. This aspheric lens is situated so that its source-side focus lies near a second focus of the reflecting surface 6 and its optical axis coincides with that of the light source 2.

In the lighting device 5 thus configured, the light emitted from the light source 2 is reflected by the reflecting surface 6 and incident on the projection lens 7. Then, the light is focused by the projection lens 7 as well as controlled in distribution based on the aspheric configuration of the same. As a result, the light is projected toward the front with a predetermined light distribution characteristic.

The foregoing lighting devices 1 and 5, however, have had the following problems.

That is, in the lighting device 1, obtaining a desired light distribution characteristic requires the two optical members, i.e., the projection lens 3 and the distribution control member 4. The light transmittances of these optical members thus have an effect on this optical system, increasing the transmission loss of the light. These optical members can cause additional problems in accuracies, such as a positional accuracy and a tilt accuracy with each other. In addition, the large dimension in the direction of the optical axis also produces the problem of an increase in total weight.

With the lighting device 5, the use of the reflecting surface 6 can make the light transmission loss smaller than in the lighting device 1. Nevertheless, since the reflecting surface 6 is arranged behind the light source 2, there have also been problems in that the device requires a large dimension in the direction of the optical axis and has an increased total weight.

Furthermore, the lighting devices 1 and 5 are both round in appearance. This leads to stereotypical designs with fewer variations in appearance. Since it is difficult and sometimes impossible to provide functional three-dimensional appearances, there have been problems with poor merchantability and design novelty.

SUMMARY OF THE INVENTION

In view of the foregoing and other problems, desires and needs, an aspect of the invention includes a lighting device that has a simple configuration which can be formed compactly in the direction of its optical axis, that has a comparatively light weight, and that has a functional three-dimensional appearance of innovative design for the sake of enhanced merchantability and novelty.

Another aspect of the invention includes providing a lighting device that can include at least one light source and a projection lens arranged corresponding to the light source so that a source-side focal position thereof lies near the light source and an optical axis thereof generally coincides with an optical axis of the light source. In this configuration, the projection lens is a distribution control lens of convex form having an exit surface shaped aspherically so that the direction of emission is continuously refracted into a certain direction with respect to the angle of incidence from the focal position.

A second aspect of the present invention includes providing a lighting device that can include at least one light source, a reflecting member arranged corresponding to the light source and having an elliptic reflecting surface situated so that a first focal position thereof lies near the light source and a major axis thereof coincides with an optical axis of the light source, and a projection lens situated so that a focus thereof lies near a second focal position of the reflecting surface and an optical axis thereof generally coincides with the major axis of the reflecting surface. In this configuration, the projection lens is a distribution control lens of convex form having an exit surface shaped aspherically so that the direction of emission is continuously refracted into a certain direction with respect to the angle of incidence from the second focal position.

In the lighting devices described above, the reflecting member may be arranged only in the area forward of the light source.

In the lighting devices described above, the projection lens may function as a convex lens in a first direction perpendicular to the optical axis, and emit light diffused in a second direction perpendicular to both the optical axis and the first direction.

In the lighting devices described above, the projection lens may refract the light in the second direction so that the angle of emission has a predetermined ratio to the angle of incidence.

Furthermore, in the lighting devices described above, the light source may be a light emitting device, and in particular, a light emitting diode.

In the lighting devices described above, the reflecting member may have a mounting part for fixing and holding the projection lens.

According to the foregoing first aspect, when light emitted from the light source is incident on the corresponding projection lens, it is focused by the projection lens and projected toward the front. On this occasion, the light incident on the projection lens from the light source is refracted so that the direction of emission is changed into a certain direction with respect to the angle of incidence based on the shape of the exit surface of the projection lens. This achieves a light distribution control. Here, the shape of the exit surface of the projection lens can be controlled to easily realize an arbitrary and/or predetermined light distribution characteristic.

According to this aspect of the invention, the projection lens may have a distribution control function. No more than one optical member may be necessary to transmit the light from the light source. In other words, as compared to the case where the projection lens is accompanied with an additional distribution control member, it is possible to reduce the transmission loss, reduce the size in the direction of the optical axis, and achieve weight saving.

Furthermore, in the foregoing aspect, the exit surface of the projection lens is not necessarily formed to be rotationally symmetrical about the optical axis. The projection lens, as viewed from the front, thus may have a rim of rotationally asymmetric shape, and not a perfectly circular one. This allows innovative designs for enhanced merchantability and novelty.

According to the foregoing second aspect, the light emitted from the light source is incident on the reflecting surface of the corresponding reflecting member, and reflected from this reflecting surface toward the second focal position. Then, the light is focused by the projection lens, and projected toward the front.

Here, the light that is reflected by the reflecting surface of the reflecting member and incident on the projection lens is refracted so that the direction of emission is changed into a certain direction with respect to the angle of incidence based on the shape of the exit surface of the projection lens. This achieves a light distribution control.

As is the case with the lighting device according to the first aspect, it is then possible to realize an arbitrary and/or predetermined light distribution characteristic. In addition, the projection lens has a distribution control fiction. It may therefore be possible to reduce the transmission loss, reduce the size in the direction of the optical axis, and achieve weight saving. This also allows innovative designs for enhanced merchantability and novelty.

In the foregoing aspect, the reflecting member can be arranged only in an area forward of the light source. Here, the reflecting member has no protrusion behind the light source. This allows a further reduction of the dimension in the direction of the optical axis.

The projection lens may function as a convex lens in a first direction perpendicular to the optical axis, and may emit light diffused in a second direction perpendicular to both the optical axis and the first direction. In this case, it is possible to obtain a light distribution characteristic of a flat projection pattern, diffused in the second direction.

The projection lens refracts the light in the second direction so that the angle of emission has a predetermined ratio to the angle of incidence. This also makes it possible to obtain a light distribution characteristic of a flat projection pattern, diffused in the second direction.

The light source can be a light emitting device, such as an LED. In this case, the light emitted from the light source, or the light emitting device or LED in particular, is given the light distribution characteristic controlled by the projection lens and is projected toward the front.

The reflecting member can have a mounting part such as an indent, a mounting surface, a separate attachment structure, etc., attached to or built into the reflecting member for fixing and holding the projection lens. In this case, the reflecting member and the projection lens can be accurately and easily positioned with respect to each other.

As described above, the exit surface of the projection lens can be given a surface configuration having a distribution control function. This eliminates the need for conventional separate distribution control members. The optical system thus allows a reduction in the transmission loss of the light from the light source. The optical system can also be configured compactly in the direction of the optical axis, with a lighter weight on the whole. Moreover, the projection lens, as viewed from the front, does not necessarily have a rim of perfectly circular shape, but can have other shapes, such as an elliptic or other odd-shape. This allows innovative designs for enhanced merchantability and novelty.

BRIEF DESCRIPTION OF THE DRAWINGS

These and other characteristics, benefits and advantages of the invention will become clear from the following description with reference to the accompanying drawings, wherein.

DETAILED DESCRIPTION OF PREFERRED EMBODIMENTS

Hereinafter, exemplary embodiments of the invention will be described in detail with reference to FIGS. 3 to 13.

Incidentally, the following embodiments are concrete examples of the invention, and thus include various features that are technically beneficial and/or operable. Nevertheless, the scope of the invention shall not be limited to these aspects.

Figure 1:
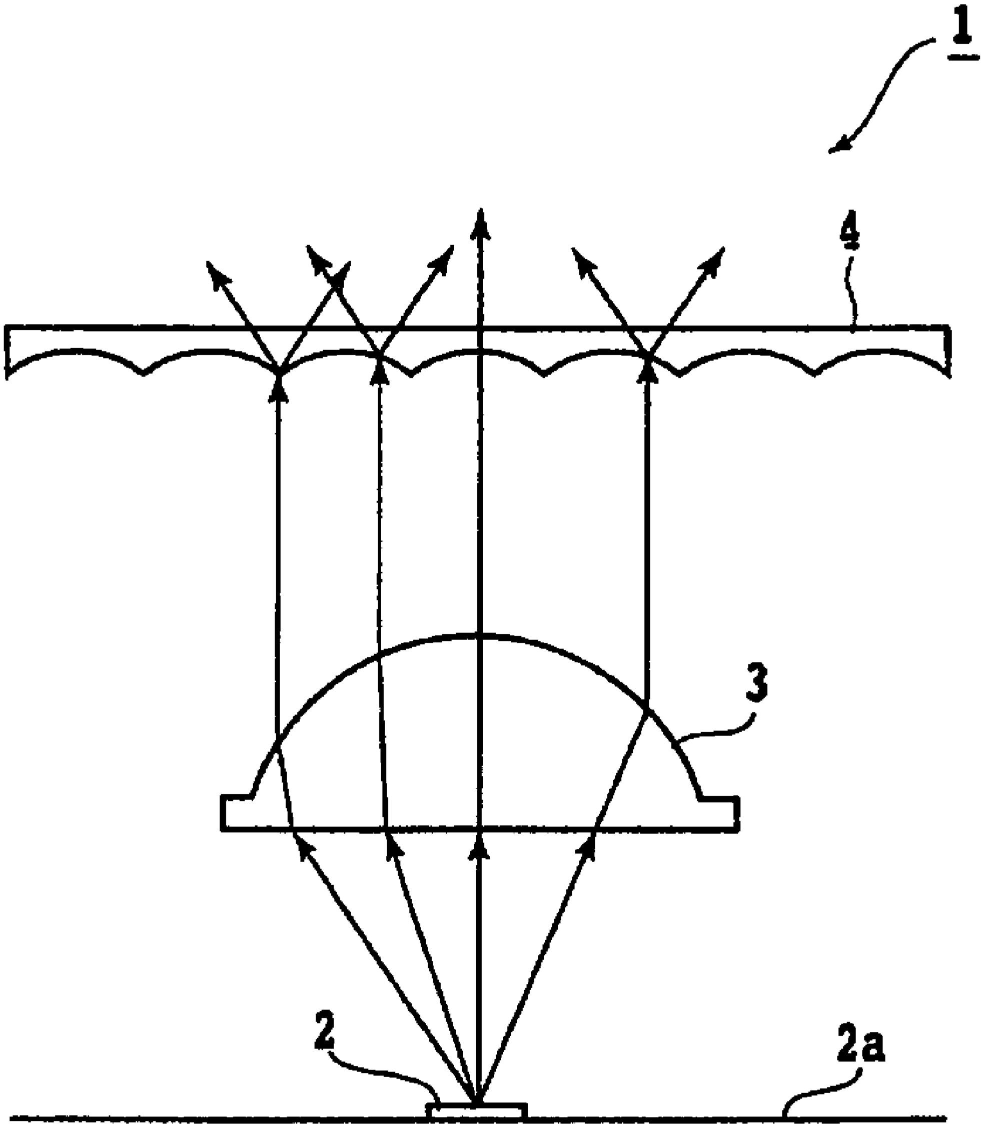
Fig. 1 Conventional Art
FIG. 1 is a schematic sectional view showing the configuration of an example of a conventional lighting device.
Figure 2:
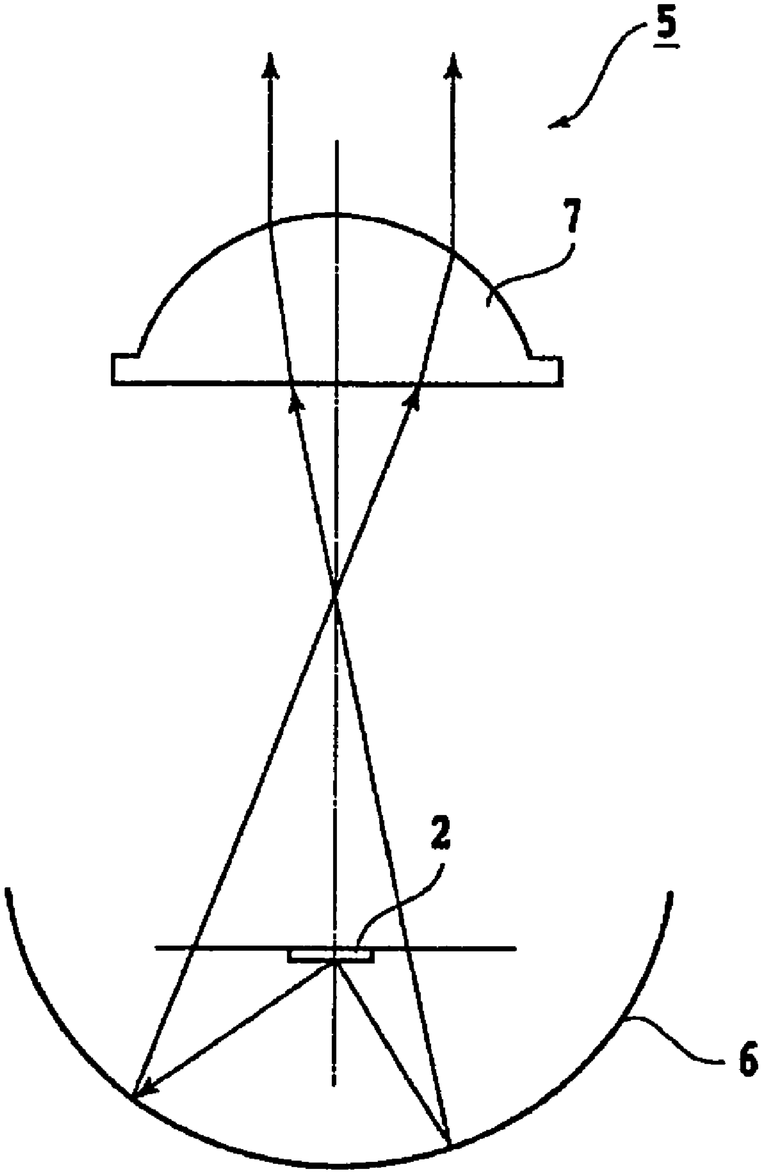
Fig. 2 Conventional Art
FIG. 2 is a schematic sectional view showing the configuration of another example of a conventional lighting device.
Figure 3:
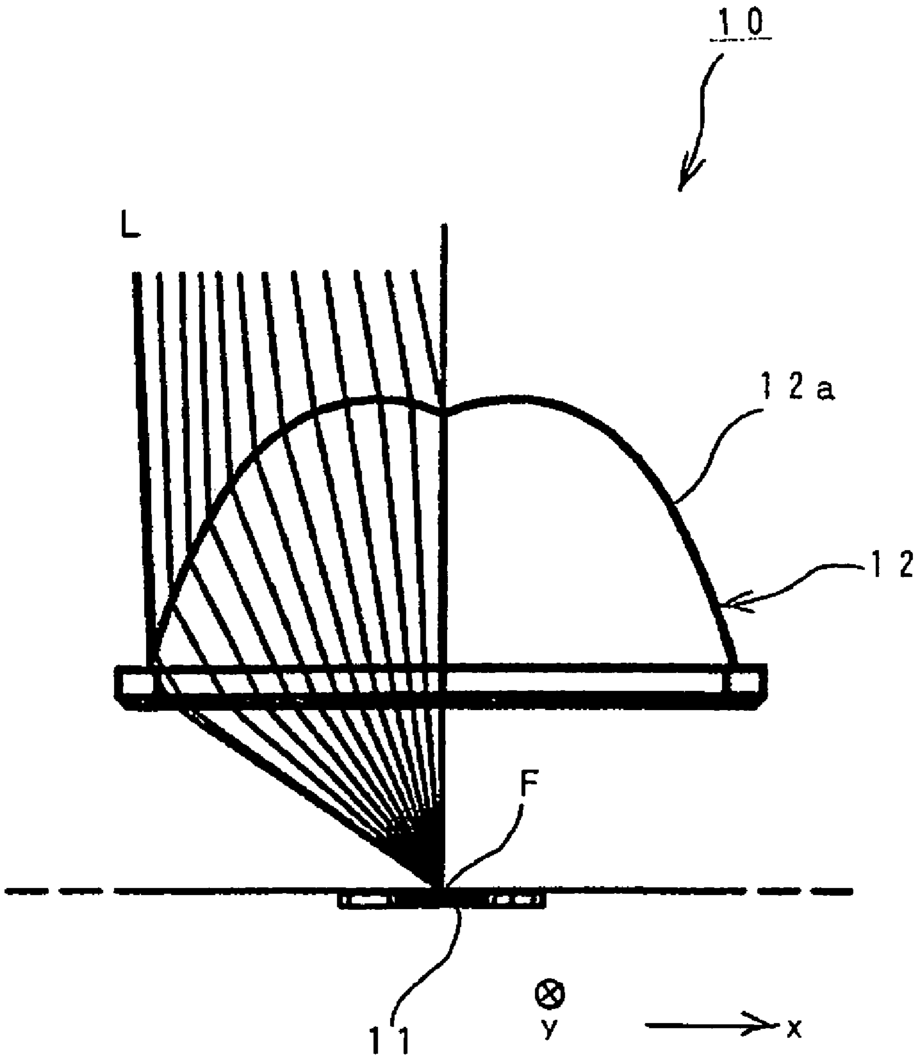
FIG. 3 is a schematic sectional view showing the configuration of a first exemplary embodiment of a lighting device made in accordance with principles of the invention.

FIG. 3 shows the configuration of a lighting device according to an exemplary embodiment of the invention.

In FIG. 3, the lighting device 10 can include a light source, or a bulb 11, and a projection lens 12 which lies in front of the bulb 11 and focuses light from the bulb 11.

For example, the bulb 11 may be an incandescent bulb, a halogen lamp, a halogen lamp with an infrared reflecting film, a discharge lamp such as a metal halide lamp, or other light source. The bulb 11 can be fixed, held, and fed by a socket. Incidentally, the lighting device may use an LED for its light source, instead of the bulb 11.

The projection lens 12 can be generally convex in shape, and placed on the optical axis extending in front of the bulb 11. The projection lens 12 focuses the light from the bulb 11 and projects it toward the front. Here, the projection lens 12 can be situated so that its focus F on the side of the bulb 11 lies near the bulb 11.

Figure 4:
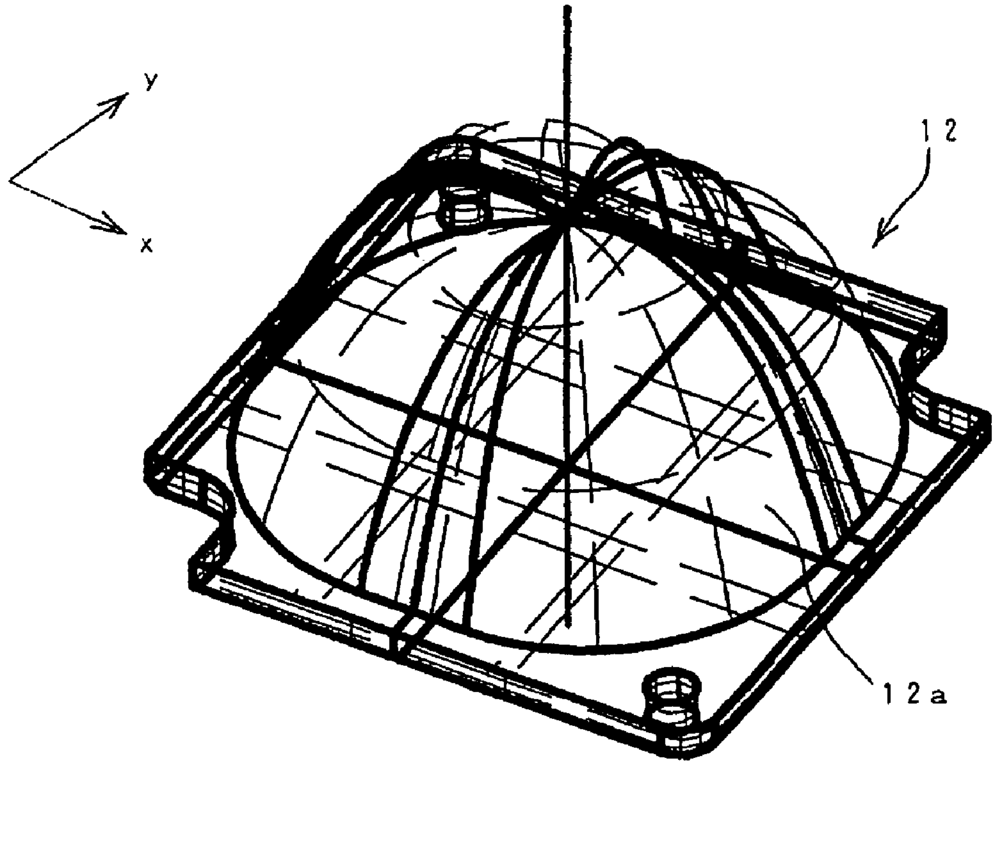
FIG. 4 is a schematic perspective view showing a projection lens of the lighting device of FIG. 3.

As shown in FIG. 4, the projection lens 12 has an exit surface, or a front surface 12*a*, that is formed as a distribution control lens. The distribution control will be described in more detail below.

The exit surface 12*a* of the projection lens 12 can be formed into an aspheric shape, so that light incident from the focal position F is emitted so that the direction of emission is continuously refracted into specified directions with respect to the angle of incidence.

Figure 5:
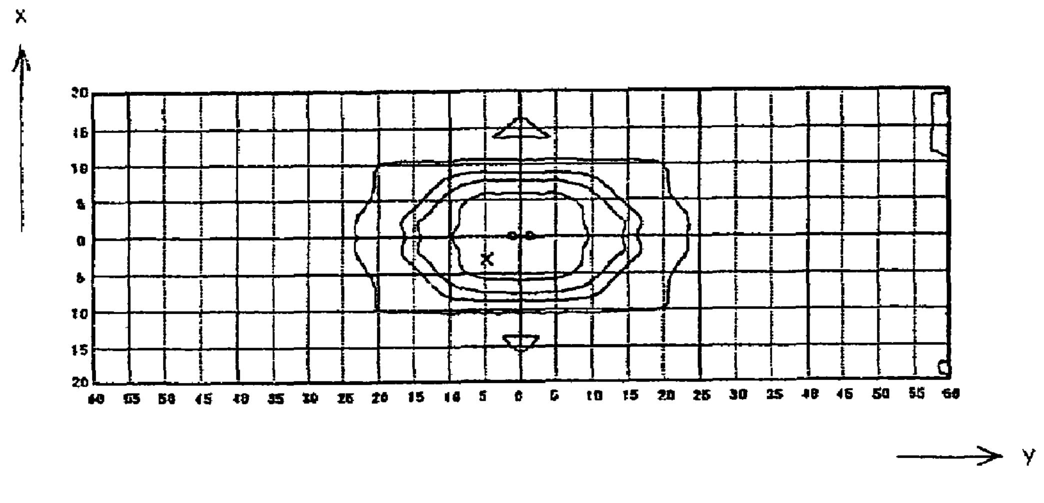
FIG. 5 is a graph showing light distribution characteristics of the lighting device of FIG. 3.

FIG. 5 shows simulated light distribution characteristics for the projection lens 12.

In the present exemplary embodiment, the projection lens 12 is designed on the basis of a convex lens. In particular, given an angle of incidence $\theta 1$ of light, the angle of emission $\theta 2$ can be calculated uniquely based on the angle of incidence $\theta 1$ (and such constants as the backside configuration and the refractivity of the projection lens 12).

Figure 6:
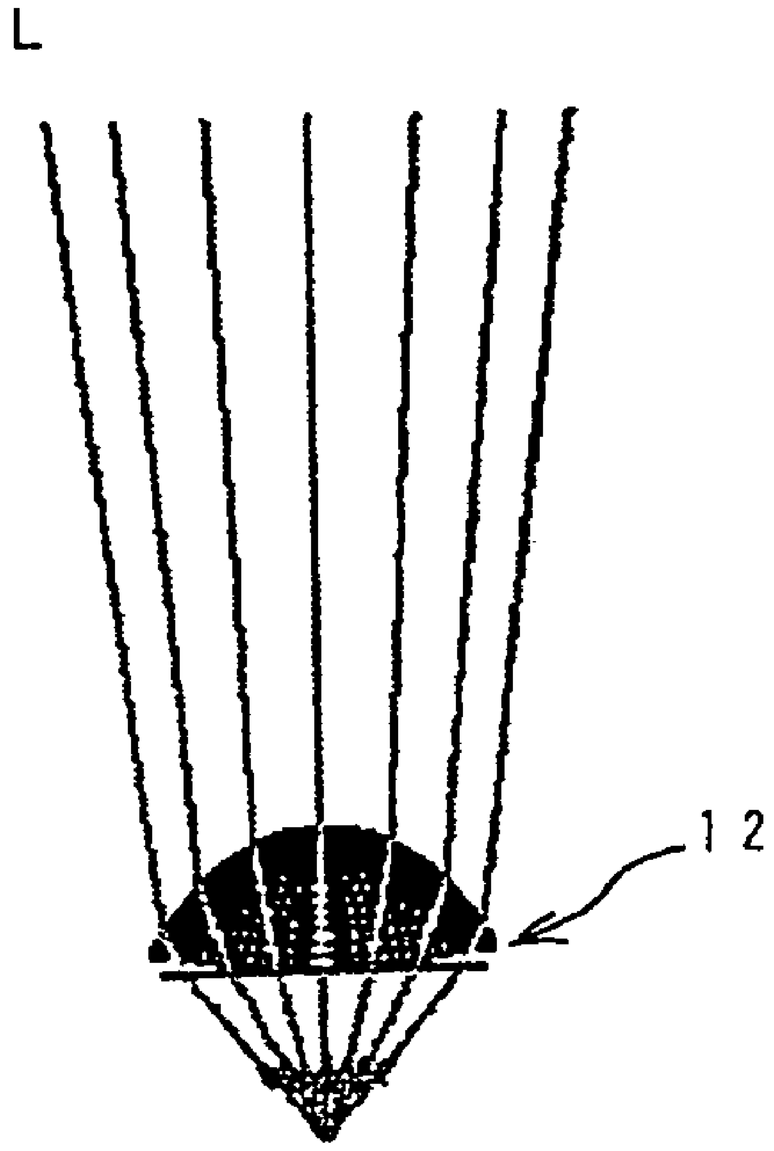
FIG. 6 is a schematic diagram showing a design example of the projection lens for the lighting device of FIG. 3.

The projection lens 12 is configured to function as a convex lens and emit parallel light in a first direction x perpendicular to its optical axis. The projection lens 12 is also configured, for example, so that it provides the angle of emission $\theta 2=0.2\theta 1$ with respect to the angle of incidence $\theta 1$ as far as a second direction y perpendicular to the first direction x is concerned. FIG. 6 shows how incident light is diffused here.

Figure 7A:
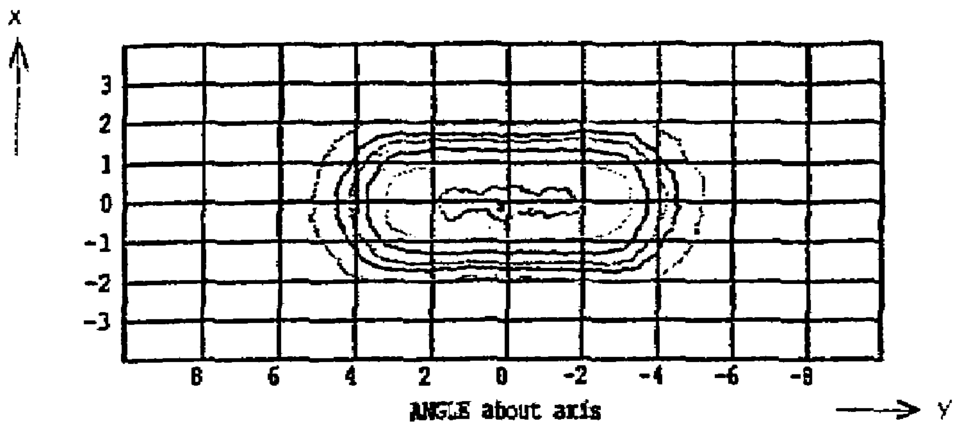
FIGS. 7A and 7B are graphs showing light distribution characteristics of an ordinary convex lens and that of the projection lens according to the design example of FIG. 6.
Figure 7B:
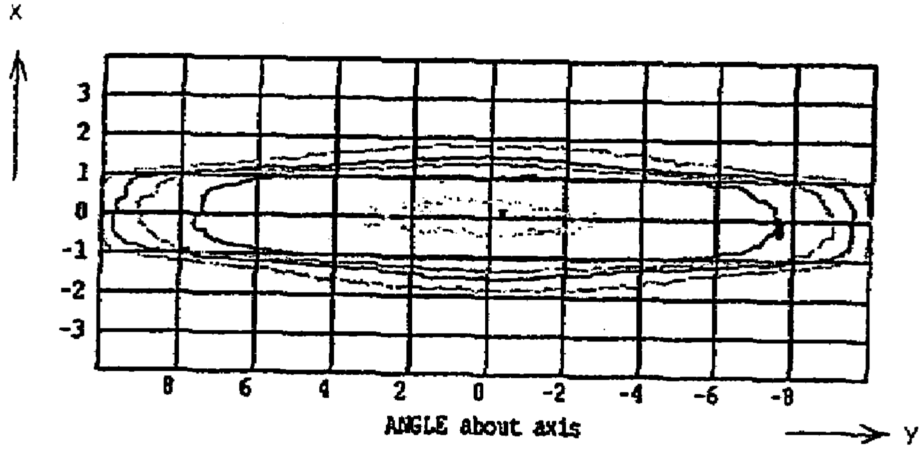

Consequently, as compared to the light distribution characteristic of an ordinary convex lens (see FIG. 7A), the projection lens 12 can have light distribution characteristics as shown in FIG. 7B. That is, the projection lens 12 functions as a so-called horizontal diffusion lens which diffuses incident light in the second direction.

Incidentally, a projection lens 12 like this can be designed, for example, by using lens design techniques disclosed in Japanese Patent Laid-Open Publication No. 2004-087179, which disclosure is incorporated herein in its entirety by reference. For example, it can be designed easily by determining the position of the exit surface based on the direction of emission with respect to the angle of incidence $\theta 1$ in units of small angles.

The projection lens 12 can thus be given the foregoing light distribution characteristic shown in FIG. 5 by appropriately determining the surface configuration of the front surface 12*a*.

In the lighting device 10 thus configured, the bulb 11 is fed from the socket for light emission. Here, the light L emitted from the emission center of the bulb 11 is incident on the projection lens 12, and is focused and projected toward the front by the projection lens 12.

In this case, the front surface 12*a* or the exit surface of the projection lens 12 can have a distribution control function, being shaped to the surface configuration mentioned above. This eliminates the need for conventional distribution control members, thereby allowing a reduction in parts count and a lighter weight on the whole. In addition, the light from the light source, or the bulb 11, is transmitted through the projection lens 12 alone before being projected toward the front. The light transmission loss in the optical system can thus be reduced.

Moreover, when the projection lens 12 is viewed from the front, the rim of the projection lens 12 is not necessarily a perfect circle in shape. This allows for novel designs.

Figure 8:
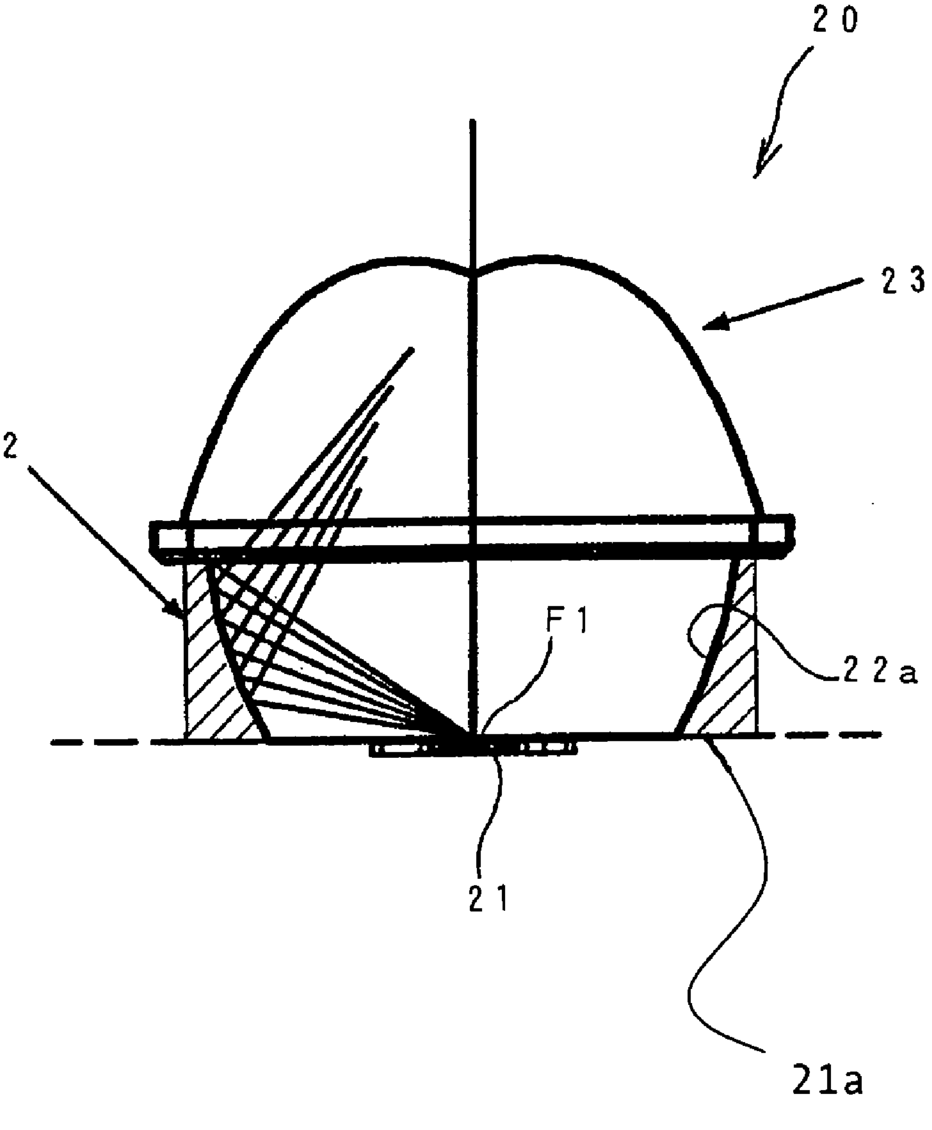
FIG. 8 is a schematic sectional view showing the configuration of another exemplary embodiment of a lighting device made in accordance with principles of the invention.

FIG. 8 shows the configuration of a lighting device according to another exemplary embodiment of the invention.

In FIG. 8, the lighting device 20 includes a bulb 21, a reflecting member 22, and a projection lens 23. The bulb 21 serves as a light source. The reflecting member 22 is arranged so as to surround the bulb 21 and has a reflecting surface 22*a* for reflecting the light from the bulb 21 toward the front. The projection lens 23 lies in front of the bulb 21, and focuses the light from the bulb 21 and the reflecting surface 22*a*. The bulb 21 may have the same configuration as that of the bulb 11 described above. It can thus be fixed, held, and fed by a socket. Incidentally, the lighting device here may use an LED for its light source, instead of the bulb 21.

Figure 9:
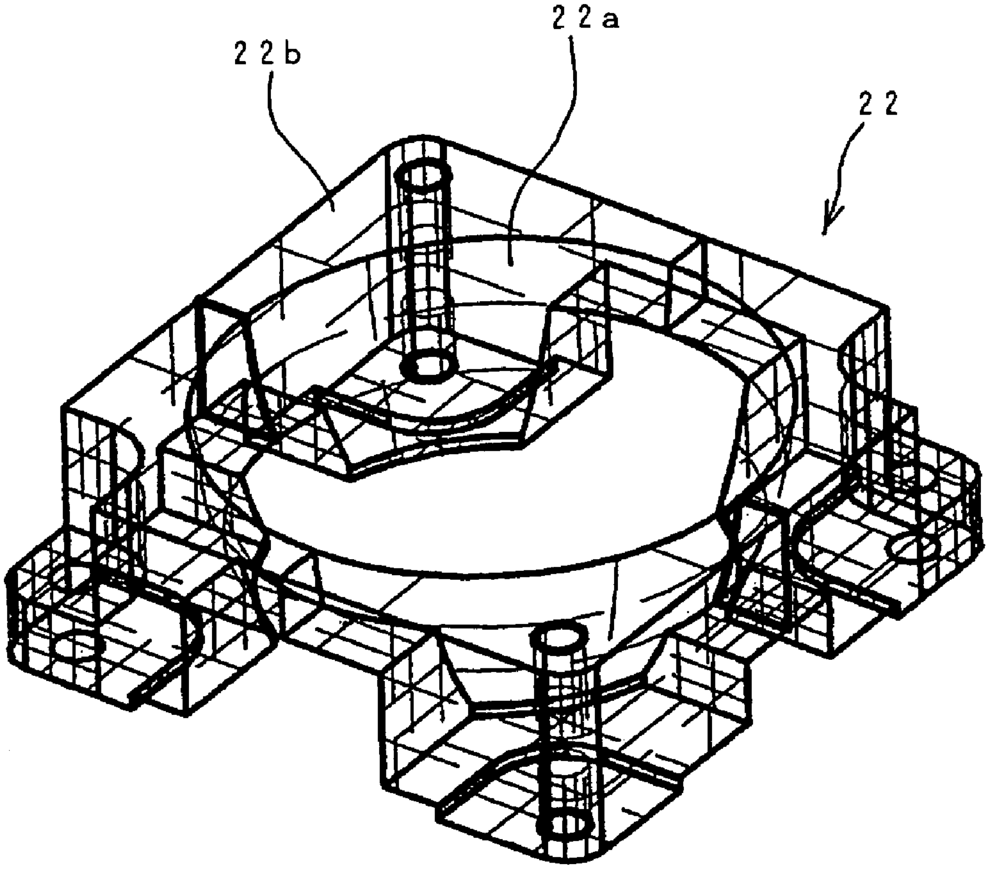
FIG. 9 is a schematic perspective view showing the reflecting member of the lighting device of FIG. 8.

The reflecting member 22 can be made of plastic, for example, and can have a reflecting surface 22*a* which opens to the top as shown in FIG. 9. A reflecting film or reflective coating is formed over this reflecting surface 22*a*, for example.

This reflecting surface 22*a* may be formed only in an area forward of a mounting board 21*a* of the bulb 21. It reflects the light from the bulb 21 toward the front, introducing it to the projection lens 23. For example, this reflecting surface 22*a* may be formed as an elliptic reflecting surface that sinks away from the front.

Here, the elliptic reflecting surface may be a free-form surface based on a spheroidal or ellipsoidal surface.

The reflecting surface 22*a* is then situated so that a first focus F1 thereof lies near the bulb 21 and its major axis is along the optical axis of the bulb 21.

The top of the reflecting member 22 is formed as a mounting surface 22*b* intended for the projection lens 23. The projection lens 23 is placed on this mounting surface 22*b* of the reflecting member 22, and fixed by screws, adhesive or the like. The projection lens 23 can thus be accurately and easily positioned with respect to the reflecting member 22.

The projection lens 23 can have the same convex shape as that of the projection lens 12, and can be placed on the optical axis extending in front of the bulb 21. The projection lens 23 focuses the light coming directly from the bulb 21 and the light reflected from the reflecting surface 22*a*, and projects the resultant light toward the front.

Here, the projection lens 23 is situated so that its focus on the side of the bulb 21 lies near the first focus F1 of the reflecting surface 22*a*.

In the lighting device 20 thus configured, the bulb 21 is fed from the socket for light emission. Here, the light L emitted from the emission center of the bulb 21 is incident on the projection lens 22 directly or after being reflected from the reflecting surface 22*a* of the reflecting member 22. The light L is then focused and projected toward the front by the projection lens 23.

In this case, the front surface, or exit surface, of the projection lens 23 has a distribution control function. This eliminates the need for conventional distribution control members, thereby allowing a reduction in parts count and a lighter weight on the whole. In addition, the light from the light source, or the bulb 21, can be transmitted through the projection lens 23 alone before being projected toward the front. Light transmission loss in the optical system can thus be reduced.

Since the reflecting surface 22*a* of the reflecting member 22 may be formed only in the area forward of the bulb 21, the entire lighting device 20 can be configured compactly in the direction of the optical axis.

In addition, when the projection lens 23 is viewed from the front, the rim of the projection lens 23 is not necessarily a perfect circle in shape. This allows for novel designs.

Figure 10:
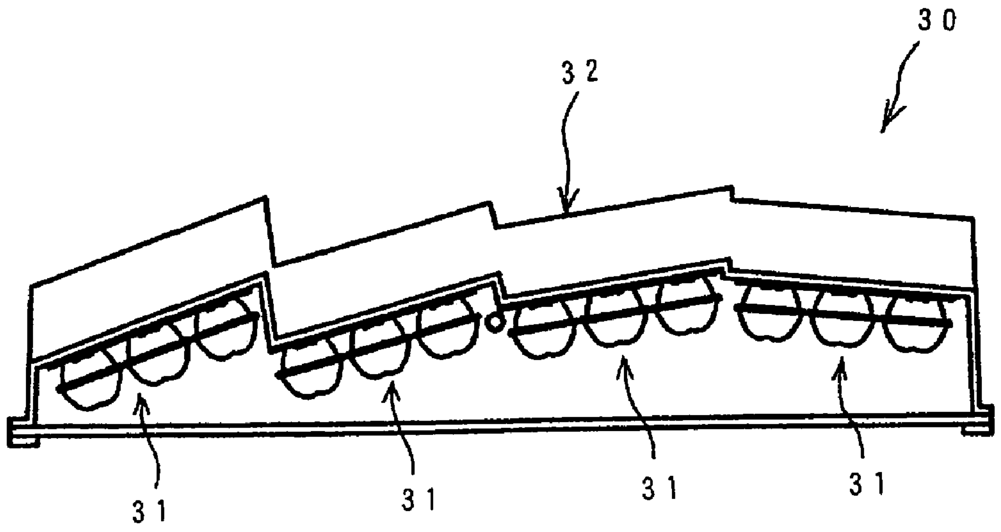
FIG. 10 is a schematic sectional view showing the configuration of another exemplary embodiment of a lighting device made in accordance with principles of the invention.

FIG. 10 shows the configuration of a lighting device according to another exemplary embodiment of the invention.

In FIG. 10, the lighting device 30 is formed as a lighting fixture including a plurality of lighting devices 10 as shown in FIG. 3.

Figure 11:
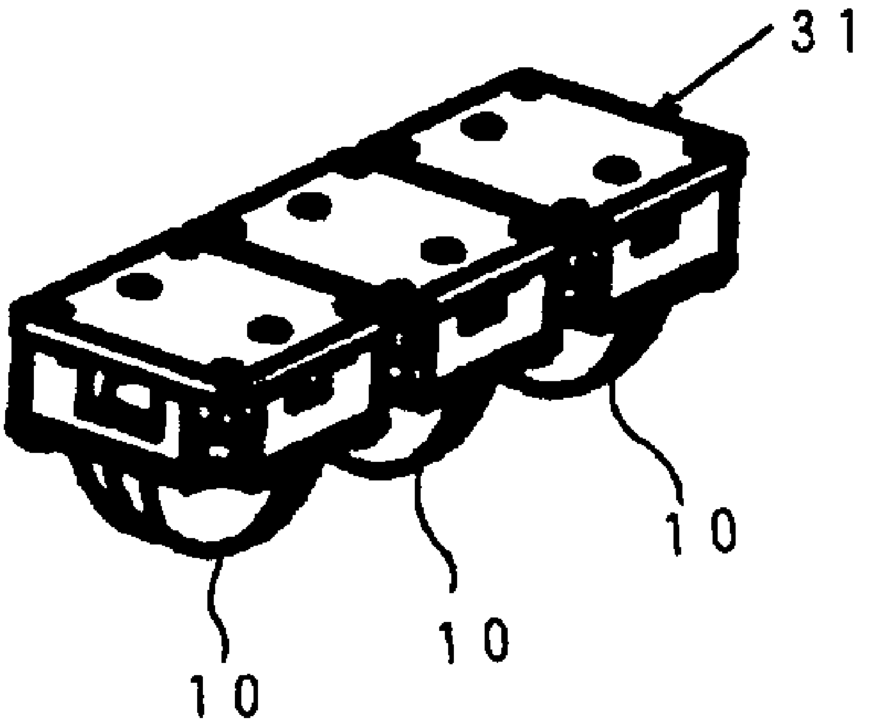
FIG. 11 is a schematic perspective view showing a lighting device unit in the lighting device of FIG. 10.

In the lighting device 30, the lighting devices 10 are grouped by threes to form lighting device units 31 as shown in FIG. 11. Each of the lighting device units 31 has three lighting devices 10 which are fixed and held in the same direction. The lighting devices 10 may use LEDs for their respective light sources, instead of the bulbs 11. Here, the lighting devices 10 are each configured to have a light distribution characteristic intended for a relatively narrow coverage.

The present exemplary embodiment includes twenty-four (24) lighting device units 31 in total, each of which is fixed in a predetermined orientation with respect to a housing 32. Consequently, the lighting device units 31 irradiate 24 sections of projection area with light, respectively.

Consequently, the lighting device 30 as a whole has a light distribution characteristic that includes a relatively wide coverage.

Figure 12:
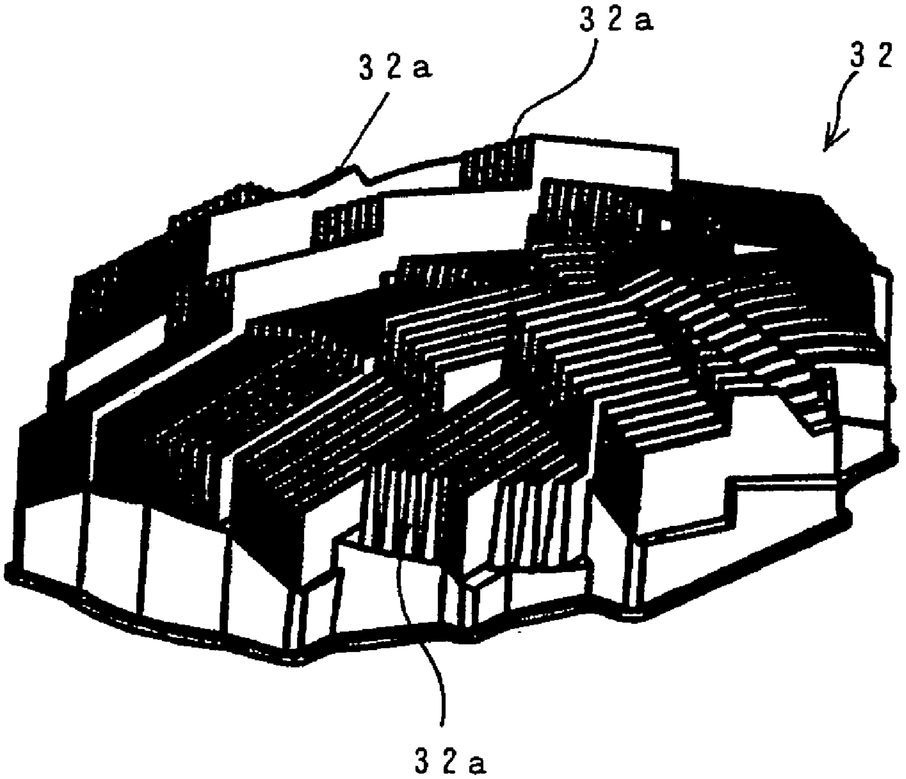
FIG. 12 is a schematic perspective view showing a housing of the lighting device of FIG. 10.

As shown in FIG. 12, the housing 32 has heat sinks 32*a* for radiating heat generated by the lighting device units 31 on its outside.

Figure 13:
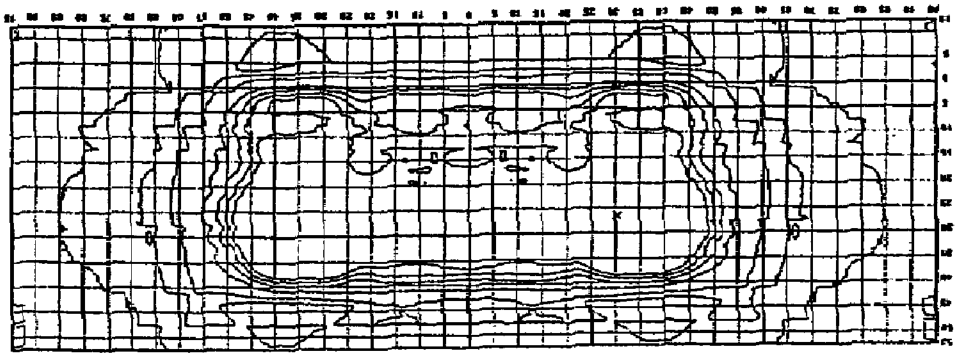
FIG. 13 is a graph showing light distribution characteristics of the lighting device of FIG. 10.

According to the lighting device 30 thus configured, each of the lighting devices 10 constituting the lighting device units 31 can operate in a similar manner as compared to operation of the lighting device 10 shown in FIG. 3. The lighting device 30 thus offers a wide range of light illumination on the whole. In addition, the front surfaces 12*a* of the projection lenses 12 in the respective lighting devices 10 can be selectively shaped in accordance with appropriately-selected surface configurations, so that a uniform light distribution characteristic can be obtained on the whole. FIG. 13 shows a simulated light distribution characteristic for the lighting device of this configuration.

In using light sources of relatively low light intensities, such as LEDs, a plurality of lighting devices 10 can be combined to form a lighting device unit 31. Here, it is possible to achieve a desired light distribution characteristic by irradiating relatively narrow ranges of illumination with required intensities of light from the so-called multiple light sources.

As described above, the front surfaces of the projection lenses 12 and 23 can have a distribution control function. This eliminates the need for additional distribution control members.

As a result, the entirety of the lighting devices can be configured compactly in the direction of the optical axis and can achieve comparatively lighter weights. In addition, the projection lenses 12 and 23, as viewed from the front, have rims that can be shaped differently from a perfect circle. This allows for innovative designs for enhanced merchantability and novelty.

Consequently, it is possible to provide optimum lighting devices for various purposes, including automotive lighting devices such as headlamps, auxiliary headlamps, and signal lamps, as well as traffic sign lamps, traffic signals, general lighting, working lamps, general indicator lamps, general sign lamps, etc.

Note that the foregoing embodiments have dealt with the cases where the projection lenses 12 and 23 have flat rear surfaces. This is not restrictive, however, and it is understood that the rear surfaces may be formed in other shapes, such as a concave shape so as to surround the light sources (such as the bulb 11 and the LED).

As has been described, the exit surface of the projection lens can have a distribution control characteristic. The light incident on the projection lens from the light source or the reflecting surface is thus focused and controlled in light distribution by the projection lens. This can eliminate the need for distribution control members that are separate from the projection lens, thereby reducing the light transmission loss in the optical system. The entire lighting device can also be configured compactly with a lighter weight. In addition, the rim of the projection lens, as viewed from the front, is not necessarily perfectly circular, but can be differently shaped, including rotationally asymmetric in shape. This allows for innovative designs for enhanced merchantability and novelty.

As described above, it is possible to provide a lighting device of simple configuration which can be formed compactly in the direction of the optical axis and which can have a reduced weight on the whole. The lighting device can also have a functional, three-dimensional innovative appearance for enhanced merchantability and novelty.

While there has been described what are at present considered to be beneficial and exemplary embodiments of the invention, it will be understood that various modifications may be made thereto, and it is intended that the appended claims cover all such modifications as fall within the true spirit and scope of the invention.

What is claimed is:

1. A lighting device comprising:

at least one light source having an optical axis; and a projection lens having an optical axis and a source-side focal position, the projection lens located adjacent said light source so that the source-side focal position is located substantially at said light source and the optical axis of the projection lens substantially coincides with the optical axis of said light source, said projection lens being a distribution control lens of convex form having an exit surface that is aspherically shaped so that a direction of emission light is continuously refracted into a certain direction with respect to an angle of incidence $\theta 1$ of light originating from the focal position, the aspherically shaped exit surface of the distribution control lens including a concave surface portion located between a first convex surface and a second convex surface, the optical axis of the projection lens intersecting the concave surface portion;

wherein the aspherically shaped exit surface of the distribution control lens is configured such that an angle of emission θ2 is related to the angle of incidence θ1 in accordance with the formula $\theta 2=0.2\theta 1$.

2. The lighting device according to claim 1, wherein said projection lens functions as a convex lens in a first direction perpendicular to the optical axis, and emits light diffused in a second direction perpendicular to both the optical axis and the first direction.

3. The lighting device according to claim 2, wherein said projection lens refracts the light in the second direction so that an angle of emission of the emitted light has a predetermined ratio to an angle of incidence of the light originating from the focal position.

4. The lighting device according to claim 3, wherein said light source is a light emitting semiconductor device.

5. The lighting device according to claim 4, wherein said light source is a light emitting diode.

6. The lighting device according to claim 2, wherein said light source is a light emitting semiconductor device.

7. The lighting device according to claim 6, wherein said light source is a light emitting diode.

8. The lighting device according to claim 1, wherein the certain direction extends away from the optical axis of the projection lens and substantially all of the light emitted by the light source and incident on the projection lens is diffused in the certain direction.

9. The lighting device according to claim 1, wherein substantially all of the light emitted by the light source is directly incident on the projection lens, and the emission light is diffused by the projection lens in a first direction and in the certain direction, where the first direction is substantially perpendicular to the optical axis of the projection lens, the certain direction is substantially perpendicular to the first direction, and wherein a distance of the emission light diffused in the certain direction is substantially greater than a distance of the emission light diffused in the first direction.

10. The lighting device according to claim 9, wherein a ratio of the distance of the emission light diffused in the first direction to the distance of the emission light diffused in the certain direction is approximately 4:20.

11. A lighting device comprising:

at least one light source having an optical axis;

a reflecting member located adjacent said light source, the reflecting member having a reflecting surface that has a first focal position, a second focal position, and a major axis, the reflecting surface being situated so that the first focal position of the reflecting surface is located substantially at said light source and the major axis of the reflecting surface substantially coincides with the optical axis of said light source; and a projection lens having an optical axis and a focus, the projection lens situated so that the focus of the projection lens is located substantially at the second focal position of said reflecting surface, and the optical axis of the projection lens substantially coincides with the major axis of said reflecting surface, said projection lens being a distribution control lens of convex form having an exit surface that is aspherically shaped so that a direction of emission light is continuously refracted into a certain direction with respect to an angle of incidence θ1 of light originating from the second focal position, wherein the light source is a light emitting semiconductor device, the aspherically shaped exit surface of the distribution control lens including a concave surface portion located between a first convex surface portion and a second convex surface portion, the optical axis of the projection lens intersecting the concave surface portion;

wherein the aspherically shaped exit surface of the distribution control lens is configured such that an angle of emission θ2 is related to the angle of incidence θ1 in accordance with the formula $\theta 2=0.2\theta 1$.

12. The lighting device according to claim 11, wherein said reflecting member is arranged only in an area forward of said light source.

13. The lighting device according to claim 12, wherein said light source is a light emitting diode.

14. The lighting device according to claim 11, wherein said projection lens functions as a convex lens in a first direction perpendicular to the optical axis, and emits light diffused in a second direction perpendicular to both the optical axis and the first direction.

15. The lighting device according to claim 14, wherein said projection lens refracts the light in the second direction so that an angle of emission of the emitted light has a predetermined ratio to an angle of incidence of the light originating from the second focal position.

16. The lighting device according to claim 11, wherein said light source is a light emitting diode.

17. The lighting device according to claim 11, wherein said reflecting member has a mounting part configured to fix and hold said projection lens.

18. The lighting device according to claim 11, wherein the reflecting surface is an elliptic reflecting surface.

19. The lighting device according to claim 11, wherein the certain direction extends away from the optical axis of the projection lens and substantially all of the light emitted by the light source and incident on the projection lens is diffused in the certain direction.

20. The lighting device according to claim 11, wherein the emission light is diffused by the projection lens to a first extent measured in a first direction and to a second extent measured in the certain direction, where the first direction is substantially perpendicular to the optical axis of the projection lens, the certain direction is substantially perpendicular to the first direction, and the second extent is substantially greater than the first extent.

21. The lighting device according to claim 20, wherein a ratio of the distance of the emission light diffused in the first direction to the distance of the emission light diffused in the certain direction is approximately 4:20.

22. A lighting device comprising:

at least one light source having an optical axis; and a projection lens having an optical axis and a source-side focal position, the projection lens located adjacent said light source so that the source-side focal position is located substantially at said light source and the optical axis of the projection lens substantially coincides with the optical axis of said light source, said projection lens being a distribution control lens of convex form having an exit surface that is aspherically shaped so that a direction of emission light is continuously refracted into a certain direction with respect to an angle of incidence θ1 of light originating from the focal position, wherein said light source is a light emitting semiconductor device, the projection lens having an outer perimeter configured such that the projection lens is non-circular when viewed from along the optical axis of the projection lens;

wherein the aspherically shaped exit surface of the distribution control lens is configured such that an angle of emission θ2 is related to the angle of incidence θ1 in accordance with the formula $\theta 2=0.2\theta 1$.

23. The lighting device according to claim 22, wherein said light source is a light emitting diode.

24. The lighting device according to claim 22, wherein the aspherically shaped exit surface of the distribution control lens includes a concave surface portion located between a first convex surface and a second convex surface, the optical axis of the projection lens intersecting the concave surface portion.

* * * * *